United States Patent
Russell, II et al.

(10) Patent No.: US 7,505,547 B2
(45) Date of Patent: Mar. 17, 2009

(54) ASSEMBLY AND METHOD FOR MOUNTING A FUEL ASSEMBLY HAVING A PREDEFINED ORIENTATION WITHIN A NUCLEAR REACTOR

(75) Inventors: William Earl Russell, II, Wilmington, NC (US); Robert James, Wilmington, NC (US); Carlton W. Clark, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 0 days.

(21) Appl. No.: 11/644,497

(22) Filed: Dec. 22, 2006

(65) Prior Publication Data

US 2008/0152070 A1    Jun. 26, 2008

(51) Int. Cl.
G21C 3/06  (2006.01)
(52) U.S. Cl. .................. 376/453; 376/362; 376/364; 376/347
(58) Field of Classification Search .............. 376/362, 376/364, 361, 347, 453
See application file for complete search history.

(56) References Cited

U.S. PATENT DOCUMENTS

| | | | | |
|---|---|---|---|---|
| 3,100,743 A | * | 8/1963 | Aubert et al. | 376/453 |
| 3,303,099 A | * | 2/1967 | Johnston | 376/445 |
| 3,567,582 A | * | 3/1971 | Van Dievoet et al. | 376/438 |
| 3,857,755 A | * | 12/1974 | Kinzer et al. | 376/434 |
| 3,951,739 A | * | 4/1976 | Frick et al. | 376/437 |
| 4,268,357 A | * | 5/1981 | Formanek et al. | 376/364 |
| 4,309,251 A | * | 1/1982 | Anthony et al. | 376/446 |
| 4,615,862 A | * | 10/1986 | Huckestein | 376/362 |
| 4,675,151 A | * | 6/1987 | Leclerco | 376/364 |
| 4,716,015 A | * | 12/1987 | Carlson | 376/445 |
| 4,904,443 A | | 2/1990 | Carruth | |
| 5,229,068 A | | 7/1993 | Johansson et al. | |
| 5,268,948 A | * | 12/1993 | Church et al. | 376/446 |
| 5,383,751 A | | 1/1995 | Wheetley et al. | |
| 6,418,178 B1 | | 7/2002 | Kobsa | |
| 6,813,327 B1 | * | 11/2004 | Challberg | 376/362 |

* cited by examiner

*Primary Examiner*—Rick Palabrica
(74) *Attorney, Agent, or Firm*—Harness, Dickey & Pierce

(57) ABSTRACT

Assemblies and methods for mounting a fuel assembly in a nuclear reactor include a fuel assembly includes fuel rods within the fuel assembly and a lower tie plate with a fuel assembly mating fixture. A fuel support includes a fuel support mating fixture that is constructed to selectively engage the fuel assembly mating fixture during installation of the fuel assembly onto the fuel support. The fuel support mating fixture and the fuel assembly mating fixture provides for a predefined orientation of the fuel assembly to the fuel support upon mating.

10 Claims, 4 Drawing Sheets

ASSEMBLY AND METHOD FOR MOUNTING A FUEL ASSEMBLY HAVING A PREDEFINED ORIENTATION WITHIN A NUCLEAR REACTOR

FIELD

The present disclosure relates to nuclear reactors and, more specifically, fuel assemblies and fuel supports for supporting the fuel assemblies in a reactor core.

BACKGROUND

The statements in this section merely provide background information related to the present disclosure and may not constitute prior art.

A nuclear reactor pressure vessel (RPV) has a generally cylindrical shape and is closed at both ends, e.g., by a bottom head and a removable top head. A top guide is spaced above a core plate within the RPV. A core shroud, or shroud, surrounds the core plate and is supported by a shroud support structure. Particularly, the shroud has a generally cylindrical shape and surrounds both the core plate and the top guide. The top guide includes several openings, and fuel assemblies are inserted through the openings and are supported by the core plate. The core plate includes a flat plate supported by a plurality of beams.

A nuclear reactor core includes a plurality of individual fuel assemblies that have different characteristics that affect the strategy for operation of the core. For example, a nuclear reactor core typically has several hundred individual fuel assemblies that have different characteristics, each fuel bundle having a plurality of fuel rods. The fuel assemblies are arranged within the reactor core so that the interaction between the fuel assemblies satisfies regulatory and reactor design guidelines and constraints. In addition, the core arrangement determines the cycle energy, which is the amount of energy that the reactor core generates before the core needs to be refreshed with new fuel elements. The core loading arrangement preferably optimizes the core cycle energy.

A core cycle is determined from one periodic reactor core refueling to a second reactor core refueling. During the course of the cycle of operation, the excess reactivity, which defines the energy capability of the core, is controlled in two ways. Specifically, a burnable poison, e.g., gadolinia, is incorporated in the fresh fuel. The quantity of initial burnable poison is determined by design constraints typically set by the utility and by the NRC. The burnable poison controls most, but not all, of the excess reactivity. A second way is through the manipulation of control rods within the core. Control rods control the excess reactivity. Specifically, the reactor core contains control rods, which assure safe shutdown and provide the primary mechanism for controlling the maximum power peaking factor. The total number of control rods available varies with core size and geometry, and is typically between 50 and 269 in a reactor core. The position of the control rods, i.e., fully inserted, fully withdrawn, or somewhere between, is based on the need to control the excess reactivity and to meet other operational constraints, such as the maximum core power peaking factor.

Coolant is introduced in the core to cool the core and to be transitioned into steam as a working fluid for energy generation. Normal coolant flow enters the fuel assemblies as a single phased flow with slightly sub-cooled coolant. The flow approaches the fuel support vertically upward and then turns horizontally as the flow enters the inlet to a fuel support supporting a fuel assembly. The flow then passes through an orifice of the fuel support to provide a pressure drop to assist coolant distribution to the fuel assemblies. The flow then turns vertical and enters the lower tie plate of the fuel assembly and is distributed around the individual fuel rods of the fuel assembly.

It is known that reactor core design can be varied by design and layout of the control rods within the fuel assembly lattice. Often, the fuel assembly lattice is configured with differently configured fuel rods such that the fuel assembly has a defined orientation. The core is designed with a plurality of oriented fuel assemblies to improve the performance and operation of the reactor. However, fuel assemblies typically have a round shaped tie plate configured for mating with a round hole or orifice defined by the fuel support. The tie plate's rod shaped end includes a lumen for receiving fluid flow from the fuel support. Current tie plates, fuel assemblies, and fuel supports do not provide any capabilities to ensure that the fuel assemblies are installed onto the fuel supports in the orientation within the core as designed and specified. Orientation of the fuel assemblies are the responsibility of the fuel assembly installation personnel based on a visual inspection. As such, a typical problem encountered with reactor design implementation is errors due to fuel assemblies being installed having an incorrect orientation which is commonly referred to as rotated bundle error. As identified by the inventors hereof, an improved assembly and method for eliminating or at least minimizing rotated bundle error would be desirable.

SUMMARY

The inventors hereof have succeeded at designing assemblies and methods for reduction, and possibly completely eliminating, rotated bundle error due to the improper orientation of fuel assemblies within the core during fuel assembly installation. The assemblies and their use include a mating configuration between fuel assembly and particularly the tie plate of the fuel assembly, and the fuel support to ensure an orientation of the fuel assembly relative to the fuel support. Such improved fuel assemblies and fuel supports can provide for the reduction and potentially elimination of rotated bundle error.

According to one aspect, an assembly for mounting a fuel assembly in a nuclear reactor includes a fuel assembly including fuel rods within the fuel assembly and having a lower tie plate with a fuel assembly mating fixture and a fuel support including a fuel support mating fixture. The fuel support mating fixture is constructed to selectively engage the fuel assembly mating fixture during installation of the fuel assembly onto the fuel support for providing a predefined orientation of the fuel assembly to the fuel support.

According to another aspect, a fuel assembly in a nuclear reactor includes an elongated body defining a top end portion defining an upper aperture, a bottom end portion defining a lower aperture, and a cavity. A plurality of elongated fuel rods are positioned within the cavity in a predetermined pattern having a predetermined orientation and positioned between the top end portion and the bottom end portion. A lower tie plate is attached to the bottom end portion of the body including an orifice for receiving fluid flow into the cavity through the lower aperture. The lower tie plate includes a mating fixture structured to define an orientation of the lower tie plate relative to the fuel rods within the cavity.

According to yet another aspect, a fuel support for a nuclear reactor includes a body having an upper end and a lower end portion and an aperture positioned about the upper body end and structured to selectively receive a fuel assembly in a predetermined orientation relative to the body.

According to still another aspect, a method of mounting a fuel assembly in a nuclear reactor includes inserting a plurality of fuel rods in a pattern within a fuel assembly having a predetermined orientation relative to an orientation of a lower tie plate of the fuel assembly, and installing the lower tie plate of the fuel assembly into an aperture of a fuel support. The fuel assembly includes a predetermined orientation for receiving the lower tie plate. The method also includes installing by selectively aligning the orientation of the fuel assembly with the orientation of the fuel support.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

In some embodiments, an assembly for mounting a fuel assembly in a nuclear reactor includes a fuel assembly including fuel rods within the fuel assembly. The fuel assembly includes a lower tie plate with a fuel assembly mating fixture and a fuel support including a fuel support mating fixture. The fuel support mating fixture is constructed to selectively engage the fuel assembly mating fixture during installation of the fuel assembly onto the fuel support for providing a predefined orientation of the fuel assembly to the fuel support. In other embodiments, an assembly for mounting a fuel assembly in a nuclear reactor includes a fuel assembly including fuel rods within the fuel assembly. A lower tie plate with a fuel assembly mating fixture and a fuel support with a fuel support mating fixture are provided. The fuel support mating fixture is constructed to selectively engage the fuel assembly mating fixture during installation of the fuel assembly onto the fuel support for providing a predefined orientation of the fuel assembly to the fuel support. These and other embodiments can be better understood with reference to the figures.

Figure 1:
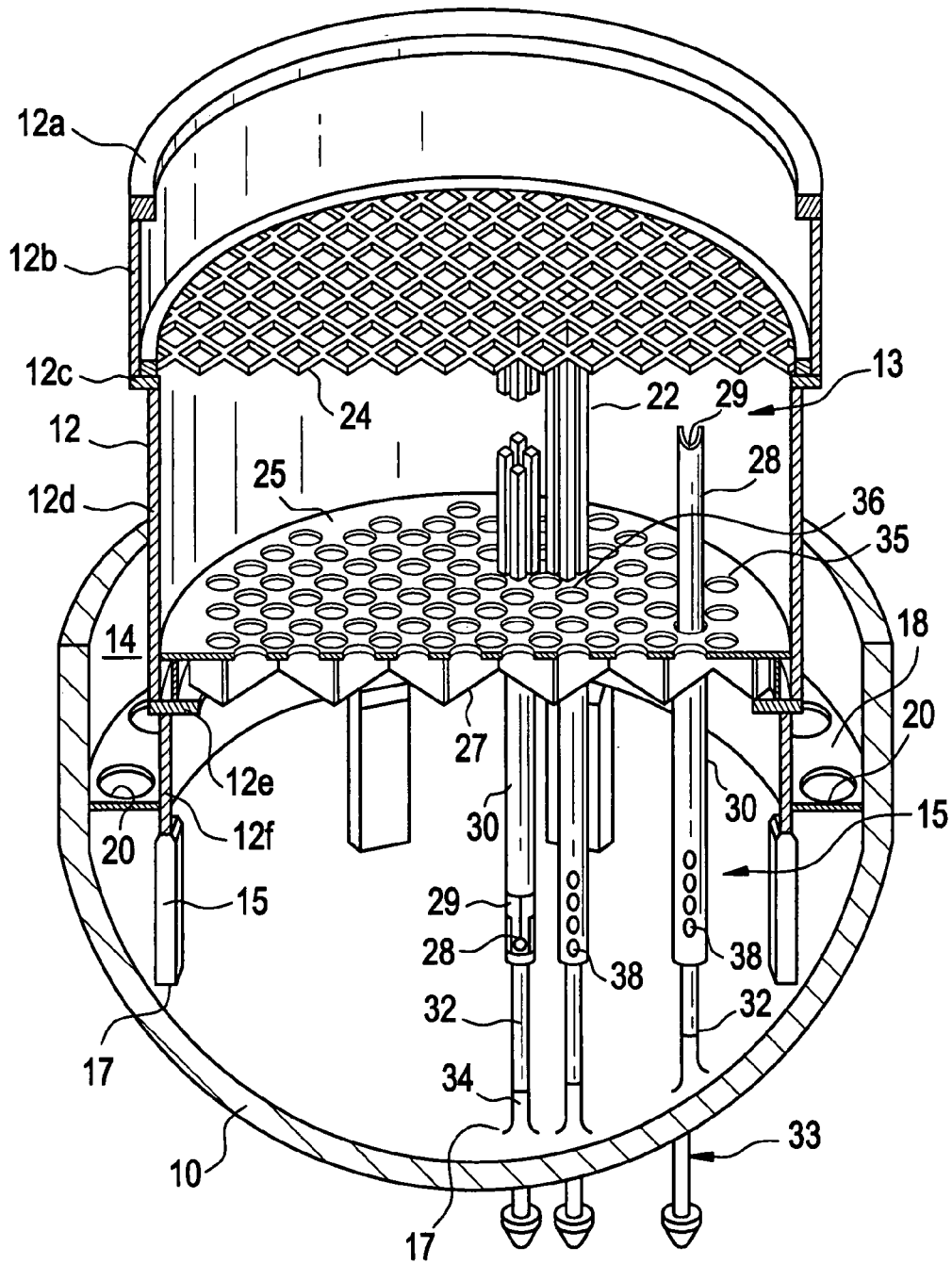
FIG. 1 is a cutaway side view of a nuclear reactor operating environment suitable for some exemplary embodiments.

As seen by way of the exemplary operating environment of FIG. 1, a conventional boiling water reactor (BWR) has a reactor pressure vessel 10 and a core shroud 12 arranged concentrically in the reactor pressure vessel 10 with an annular region, namely, the downcomer annulus 14, therebetween. It should be understood that while a BWR is depicted here, the present disclosure applies to other types of nuclear reactors as well. In the BWR, the core shroud 12 is a stainless steel cylinder surrounding the nuclear fuel core 13. In particular, the core shroud 12 comprises a shroud head flange 12a for supporting the shroud head (not shown); a circular cylindrical upper shroud wall 12b having a top end portion welded to shroud head flange 12a; an annular top guide support ring 12c welded to the bottom end portion of upper shroud wall 12b; a circular cylindrical middle shroud wall welded assembly 12d welded to the top guide support ring 12c; and an annular core plate support ring 12e welded to the bottom of the middle shroud wall 12d and to the top of a lower shroud wall 12f.

As seen in FIG. 1, the shroud 12 is vertically supported by a plurality of shroud support legs 16, each of the latter being welded to the bottom head 17 of the reactor pressure vessel 10. The core shroud 12 is laterally supported by an annular shroud support plate 18, which is welded at its inner diameter to the core shroud 12 and at its outer diameter to the reactor pressure vessel 10. The shroud support plate 18 has a plurality of circular apertures 20 in flow communication with diffusers of a plurality of jet pump assemblies (not shown), The fuel core 13 of a BWR consists of a multiplicity of upright and parallel fuel bundle assemblies 22 arranged in arrays. Each fuel assembly 22 includes an array of fuel rods inside a fuel channel made of zirconium-based alloy. Each array of fuel bundle assemblies 22 is supported at the top by a top guide 24 and at the bottom by a core plate 26 and its underlying support structure 27. The core plate 26 subdivides the reactor into the fuel core 13 and a lower plenum 15. The core top guide 24 provides lateral support for the top of the fuel assemblies 22. The core plate 26 provides lateral support for the bottom of the fuel assemblies 22. This lateral support maintains the correct fuel channel spacing in each array to permit vertical travel of a control rod 28 including the control rod blades 29 between the fuel assemblies 22.

The power level of the reactor is maintained or adjusted by positioning the control rods 28 up and down within the core 13 while the fuel bundle assemblies 22 are held stationary. Each control rod 28 has a cruciform cross section consisting of four wings or control rod blades 29 at right angles. Each blade 29 consists of a multiplicity of parallel tubes welded in a row with each tube containing stacked capsules filled with neutron-absorbing material. Each control rod 28 is raised or lowered with the support of a control rod guide tube 30 by an associated control rod drive 33 which can be releasably coupled by a spud at its top to a socket in the bottom of the control rod 28.

The control rod drives 33 are used to position control rods 28 in a BWR to control the fission rate and fission density, and to provide adequate excess negative reactivity to shutdown the reactor from any normal operating or accident condition at the most reactive time in core life. Each control rod drive 33 is mounted vertically in a control rod drive housing 32 that is welded to a stub tube 34, which in turn, is welded to the bottom head 17 of the reactor pressure vessel 10. The control rod drive 33 is a double-acting, mechanically latched hydraulic cylinder. The control rod drive 33 is capable of inserting or withdrawing a control rod 28 at a slow controlled rate for normal reactor operation and of providing rapid control rod 28 insertion (scram) in the event of an emergency requiring rapid shutdown of the reactor.

The control rod drive housing 32 has an upper flange that bolts to a lower flange of the control rod guide tube 30. Each control rod guide tube 30 sits on top of and is vertically supported by its associated control rod drive housing 32. The uppermost portion of the control rod guide tube 30 penetrates a corresponding circular core plate aperture 35 in the core plate 26. There can be more than one hundred and forty (140) control rod guide tubes 30 penetrating an equal number of circular core plate apertures 35 (of the core plate 26), each core plate aperture 35 typically has a diameter slightly greater than the outer diameter of the control rod guide tube 30.

The control rod drive housings 32 and control rod guide tubes 30 have two functions: (1) to house the control rod drive 33 mechanisms and the control rods 28, respectively, and (2) to partially support the weight of the fuel in the fuel assemblies 22. The fuel weight is reacted at an orifice of a fuel support 36 that is positioned on the core plate 26 and underlying support structure 27 as well as on top of the control rod guide tube 30. The control rod guide tubes 30 and rod drive housings 32 act as columns carrying the weight of the fuel.

During operation of the reactor, water in the lower plenum 15 enters an inlet of the fuel support 36. The water is channeled within the fuel support 36 to a lumen of a lower tie plate of the fuel assembly 22. The water continues to rise in the fuel assembly 22 and in the fuel core 13, with a substantial amount turning to steam that may be used in the production of electrical energy.

Figure 2:
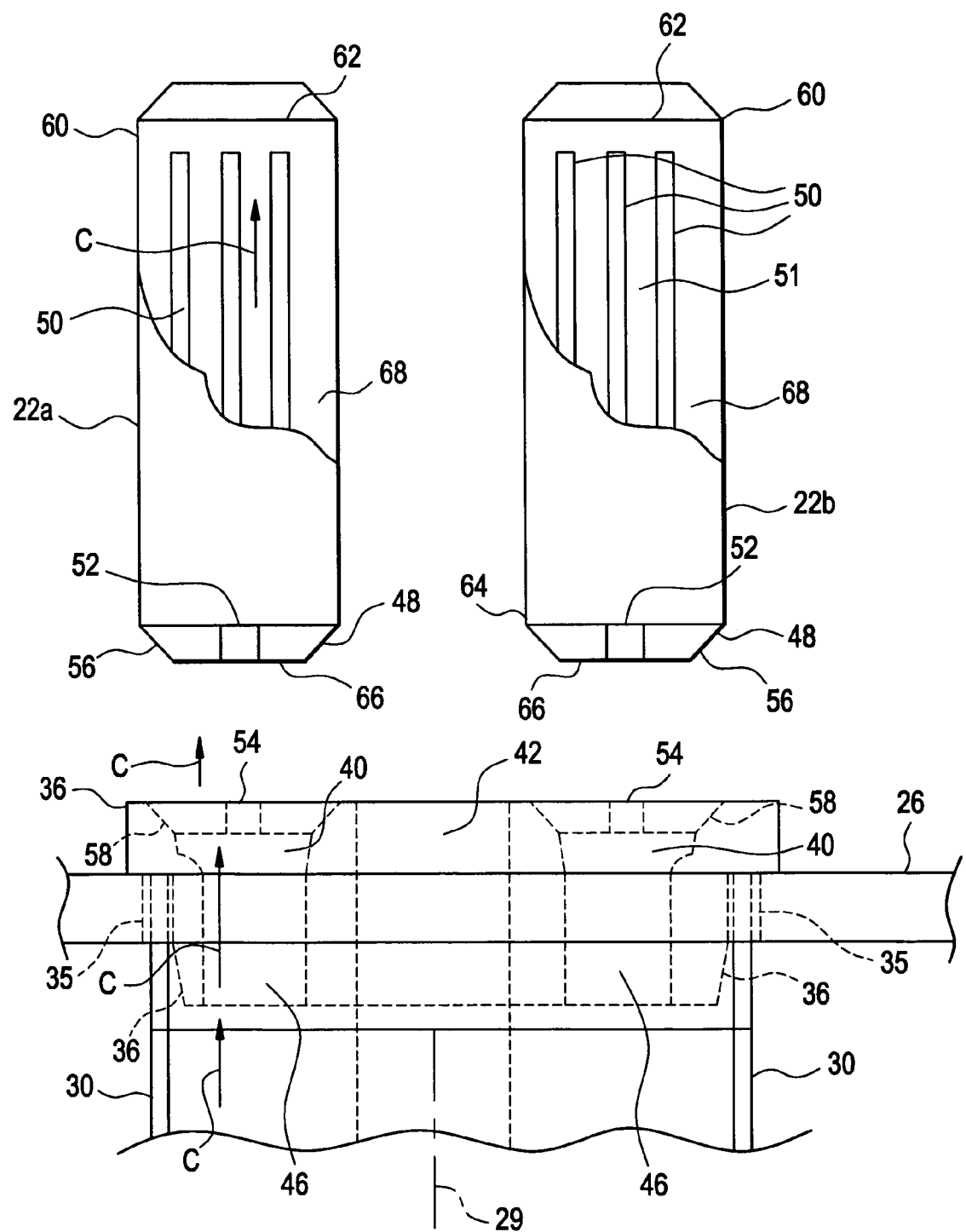
FIG. 2 is a side view of a fuel support having a fuel support mating fixture and two fuel assemblies having fuel assembly mating fixtures in a nuclear reactor core according to one exemplary embodiment.

Referring now to FIG. 2, one exemplary embodiment illustrates a fuel support 36 mounting in a core plate aperture 35 of core plate 26. Two fuel assemblies 22 (denoted as 22A and 22B) are positioned for mounting in one of the fuel support apertures 40 of the fuel support 36. As known to those skilled in the art, a fuel support 36 typically supports four fuel assemblies 22 and therefore has four fuel support apertures 40. However, only two are shown in FIG. 2 for simplicity and ease of depiction. The fuel support 36 includes a control rod chamber 42 for receiving and retaining a control rod 28 and its blades 29 (a single blade is shown in FIG. 2 by way of example). The fuel support 36 is typically coupled to the control rod guide tube 30 for channeling the control rod. The fuel support 36 receives coolant from the lower plenum either directly or indirectly such as through a portion of the control rod guide tube 30. A lumen 46 is attached to each aperture for channeling fluid (denoted by C and the arrows) through the fuel support 36 and into a lower tie plate 48 of each fuel assembly 22. After entering the tie plate 48, the fluid travels through the fuel assembly 22 and about fuel rods 50 formed in a lattice 51 contained therein. The lattice 51 can be designed to have a plurality of different fuel rods 50 for providing a desired performance including having a single design orientation. Generally, the fuel assembly 22 has an elongated body that defines a top end portion 60 with an upper aperture 62, a bottom end portion 64 defining a lower aperture 66, and a cavity 68.

The bottom end portion 64 and the lower aperture 66 can be defined by the lower tie plate 48 of the fuel assembly 22. The lower tie plate 48 can include one or more fuel assembly mating fixture 52 for coupling to and engaging with a fuel support mating fixture 54 within the fuel support aperture 40. The fuel assembly mating fixture 52 can be positioned about a radial from an axis defined by the fuel assembly 22 or the lower tie plate 48 for providing a particular orientation with the fuel rods 50 and the lattice 51 within the fuel assembly 22. The mating fixtures 52 and 54 are each designed for mating to each other and provide a predefined and limited orientation relative to each other. In such a manner, the fuel assembly 22 can only be fully installed in the fuel support aperture 40 of the fuel support 36 in the predefined orientation. The fuel assembly mating fixture 52 and fuel support mating fixture 54 are shown in FIG. 2 as being a slot and a hole, respectively. However, it should be understood that each could be any shape capable of mating to the other in order to achieve a predefined orientation relative to each other. In some embodiments, this can include multiple predefined orientations, and in others, the mating provides for only mating to a single predefined orientation. Some exemplary embodiment of shapes for the lower tie plate 48 and the fuel support aperture 40 that can also provide for mating at a predefined orientation are provided in FIGS. 4 and 5.

In some embodiments, as shown in FIG. 2, the lower tie plate 48 can include a tie plate beveled edge 56 for aiding in the installation into the fuel support aperture 40. Additionally, in some embodiments, the fuel support aperture 40 can include one or more aperture beveled or chamfered edges 58 which can assist in the seating of the lower tie plate 48 into the fuel support aperture 40. In some embodiments, the aperture chamfered edge 58 can also assist in the proper alignment of the fuel assembly 22 with the fuel support 36 for mating of the fuel assembly mating fixture 52 with the fuel support mating fixture 54.

Generally, as noted above, the fuel assembly 22 cannot be fully engaged with the fuel support 36 unless they are properly aligned and oriented to allow the mating of the fuel assembly mating fixture 52 with the fuel support mating fixture 54. If not properly aligned, the fuel assembly 22 will not seat into the fuel support aperture 40 and will be elevated relative to other properly mated fuel assemblies 22 within the core 13. Such non-mating and non-alignment is visually detectable by operating personnel during reactor core refueling.

Figure 3:
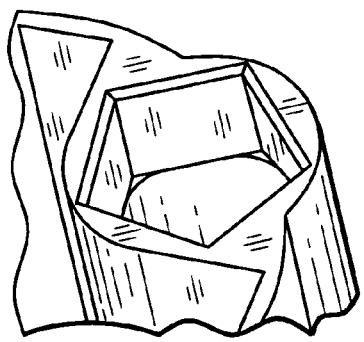
FIG. 3 is a top perspective view of a fuel support aperture defining a fuel support mating fixture providing for a predefined orientation between an installed fuel assembly and the fuel support according to one exemplary embodiment of the invention.

Referring now to FIG. 3, one embodiment of a fuel support aperture 40 having a pentagon shape with each edge of the pentagon having a chamfered edge 58. The pentagon shape can be such that each side has the same length, or it can be an irregular pentagon wherein one of the arms of the pentagon is elongated for providing a single orientation within three hundred and sixty (360) degrees, as shown in FIG. 4B by way of example.

Figure 4A:
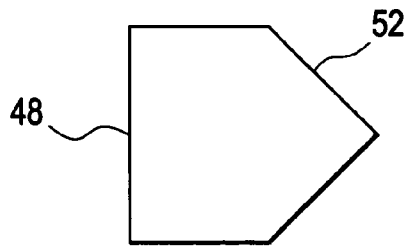
FIGS. 4A and 4B are shapes for providing a predefined orientation with FIG. 4A being a shape for a fuel assembly mating fixture and FIG. 4B being a shape for a mating fuel support mating fixture according to one exemplary embodiment.
Figure 4B:
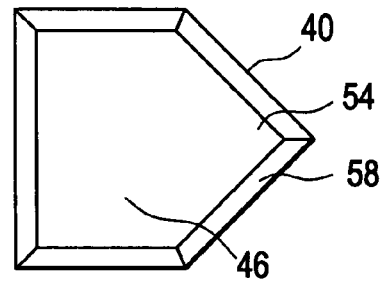

FIGS. 4A and 4B illustrate an example of another set of shapes according to another embodiment. FIG. 4A illustrates an irregular shape of a fuel assembly mating fixture 52 that is formed from the shape of the lower tie plate 48 configured for mating. FIG. 4B illustrates a fuel support mating fixture 54 also defined by the irregular shape of the fuel support aperture 40. The fuel support 36 defines the fuel support aperture 40 that is coupled to the lumen 46 from which coolant flows into the lower tie plate 48. The fuel support aperture 40 includes in this exemplary embodiment, a chamfered edge 58 that provides for alignment between the lower tie plate 48 with the fuel support aperture 40.

Figure 5A:
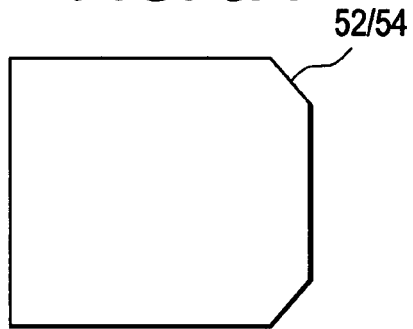
FIGS. 5A to 5D are additional exemplary shapes for mating fuel assembly and fuel support fixtures according to additional exemplary embodiments.
Figure 5B:
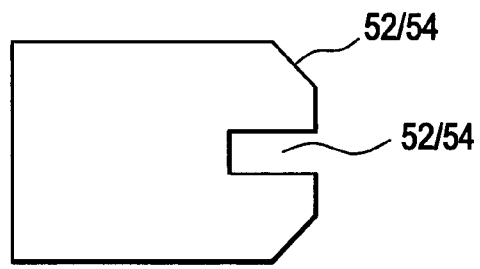
Figure 5C:
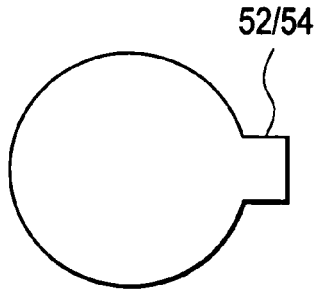
Figure 5D:
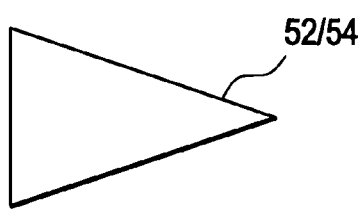

FIGS. 5A, 5B, 5C, and 5D provide for additionally exemplary shapes that can be applied to both the lower tie plate 48 and the fuel support aperture 40 for providing the fuel assembly mating fixture 52 and the fuel support mating fixture 54. FIG. 5A provides for mating to a predefined orientation due to two trimmed corners of a square shape. While shown by example here as a square, this could be a square or any parallelogram, triangle, or any shape have a plurality of defined edges meeting to form an angular shape. Additionally, the alignment could be with a single trimmed corner or two or more, but less than all, trimmed corners. FIG. 5B provides a different mating shape for providing the predefined orientation wherein the mating fixture is an inward slot versus an outward slot. FIG. 5C is a circle having a single mating fixture along one radius. FIG. 5D is an Isosceles triangle. Other triangular shapes such as a Scalene can also used for proper orientation.

As known to those skilled in the art after reviewing this disclosure, other applicable shapes can include, but is not limited to, a quadrilateral, an octagon, a heptagon, a hexagon, nonagon, decagon, and a star.

It should be understood that the fuel support mating fixture 54 can be either a male member or a female member and the fuel assembly mating fixture 52 can be either, but is generally the opposite for providing proper mating. For example, in some embodiments, a fuel support 36 supports four fuel assemblies 22, each fuel assembly 22 has a fuel assembly mating fixture 52 and the fuel support has four apertures 40 each with a fuel support mating fixture 54 for selectively receiving a different one of the fuel assemblies 22. Each fuel assembly 22 has a predefined orientation to the fuel support 36. Additionally, it is also possible for the fuel support 22 to be keyed with the circular core plate apertures 35 in which they are mounted.

Figure 6:
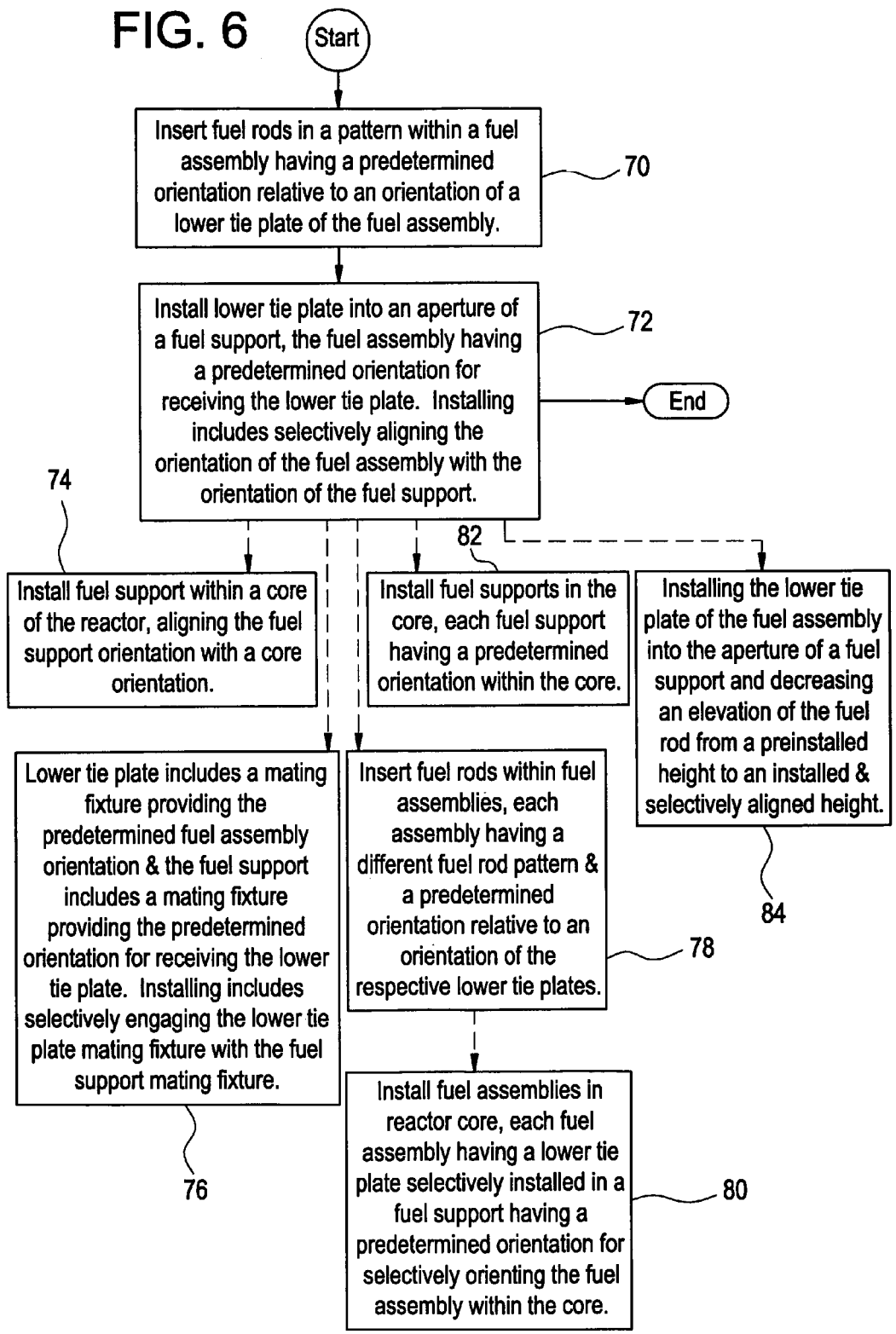
FIG. 6 is a flow chart of a method of mounting a fuel assembly in a nuclear reactor according to some exemplary embodiments.

Referring now to FIG. 6, in operation and according to one embodiment, a method of mounting a fuel assembly in a nuclear reactor includes inserting the fuel rods in a pattern within a fuel assembly having a predetermined orientation relative to an orientation of a lower tie plate of the fuel assembly as in process 70. Process 72 then provides for installing the lower tie plate of the fuel assembly into an aperture of a fuel support wherein the fuel assembly has a predetermined orientation for receiving the lower tie plate. The installing can include selectively aligning the orientation of the fuel assembly with the orientation of the fuel support. In some embodiments, process 74 can provide for installing the fuel support within a core of the reactor including aligning the orientation of the fuel support with an orientation within the core.

In other embodiments, the lower tie plate includes a lower tie plate mating fixture that provides the predetermined fuel assembly orientation and the fuel support includes a fuel support mating fixture providing the predetermined orientation for receiving the lower tie plate as provided by process 76. The installing can include selectively engaging the lower tie plate mating fixture with the fuel support mating fixture.

In yet another embodiment as shown in process 78, the fuel rods are inserted in the fuel assemblies. Each fuel assembly has a different pattern of fuel rods and a predetermined orientation relative to an orientation of the respective lower tie plates. Process 80 provides for installing the fuel assemblies in a core of the reactor with each fuel assembly having a lower tie plate selectively installed in a fuel support having a predetermined orientation for selectively orienting the fuel assembly within the core.

Process 82 provides for installing a plurality of fuel supports in the core with each fuel support being installed to have a predetermined orientation within the core. Process 84 provides for installing the lower tie plate of the fuel assembly into the aperture of a fuel support and thereby decreasing the elevation of the fuel rod from a preinstalled height to an installed and selectively aligned height.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. An assembly for mounting a fuel assembly in a nuclear reactor comprising:
   a fuel assembly including fuel rods within the fuel assembly, the fuel assembly including a lower tie plate with a fuel assembly mating fixture on a bottom portion of the fuel assembly; and
   a fuel support including a fuel support mating fixture, the fuel support mating fixture and the fuel assembly mating fixture shaped to fit into one another at only one, only two, or only three orientations of the fuel assembly relative to the fuel support,
   wherein the fuel assembly mating fixture forming a bottom portion of the fuel assembly is configured to align and mate with the fuel support mating fixture as the fuel assembly is vertically lowered into the fuel support.

2. The assembly of claim 1 wherein the fuel support is configured for elevating the fuel assembly unless the fuel assembly mating fixture is engaged with the fuel support mating fixture at the only one, only two, or only three orientations.

3. The assembly of claim 1 wherein the fuel assembly mating fixture is positioned about a radial from an axis defined by the fuel assembly at one of the only one, only two, or only three orientations of fuel assembly mating fixture relative to the fuel rods within the assembly.

4. The assembly of claim 3 wherein the fuel support mating fixture is configured from a portion of a body of the fuel support defining an aperture for receiving the lower tie plate.

5. The assembly of claim 1 wherein the fuel assembly mating fixture includes an outer shape of the lower tie plate providing the only one, only two, or only three orientations of the fuel assembly and to a lattice contained therein, and wherein the fuel support mating fixture includes an aperture with a corresponding shape defined by the fuel support for receiving the lower tie plate and maintaining the only one, only two, or only three orientations of the fuel assembly to the fuel support upon installation of the fuel assembly onto the fuel support.

6. The assembly of claim 5 wherein the outer shape of the lower tie plate and the corresponding shape of the aperture are selected from the group consisting of a triangle, a quadrilateral, a pentagon, a heptagon, and a star.

7. The assembly of claim 1 wherein the fuel assembly mating fixture includes a male member, and wherein the fuel support mating fixture includes a female member configured to receive and secure the male member to provide the only one, only two, or only three orientations.

8. The assembly of claim 7 wherein the female member includes a beveled cavity for guiding the lower tie plate into the cavity and appropriately mating the fuel assembly mating fixture with the fuel support mating fixture.

9. The assembly of claim 1 wherein the fuel support mating fixture includes a male member, and wherein the fuel assembly mating fixture includes a female member configured to receive and secure the male member to provide the only one, only two, or only three orientations.

10. The assembly of claim 1 wherein the fuel rods within the fuel assembly are arranged to have a predetermined pattern with the only one, only two, or only three orientations within the fuel assembly.

* * * * *